United States Patent
Theil et al.

(10) Patent No.: US 7,456,239 B2
(45) Date of Patent: Nov. 25, 2008

(54) ARTICLES MADE OF PMMA MOLDING COMPOUND

(75) Inventors: Alexander Theil, Reinheim (DE); Michael Zietek, Ober-Ramstadt (DE); Heinrich Gaul, Moerfelden-Walldorf (DE); Hans-Juergen Kress, Bruehl (DE); Thomas Hasskerl, Kronberg (DE); Rudolf Blass, Darmstadt (DE); Werner Hoess, Griesheim (DE)

(73) Assignee: Roehm GmbH & Co., KG, Darmstadt (DE)

( * ) Notice: Subject to any disclaimer, the term of this patent is extended or adjusted under 35 U.S.C. 154(b) by 294 days.

(21) Appl. No.: 10/523,971

(22) PCT Filed: Jul. 25, 2003

(86) PCT No.: PCT/EP03/08211

§ 371 (c)(1), (2), (4) Date: Feb. 8, 2005

(87) PCT Pub. No.: WO2004/033824

PCT Pub. Date: Apr. 22, 2004

(65) Prior Publication Data

US 2005/0267250 A1 Dec. 1, 2005

(30) Foreign Application Priority Data

Sep. 16, 2002 (DE) ................. 102 43 062

(51) Int. Cl.
*C08L 33/00* (2006.01)
(52) U.S. Cl. ........................... 524/523; 524/556
(58) Field of Classification Search ................ 524/523, 524/556
See application file for complete search history.

(56) References Cited

U.S. PATENT DOCUMENTS

| | | | |
|---|---|---|---|
| 4,731,213 A | 3/1988 | Klepsch | |
| 4,833,221 A | 5/1989 | Albrecht | |
| 5,110,877 A | 5/1992 | Hoess et al. | |
| 5,155,172 A | 10/1992 | Siol et al. | |
| 5,219,931 A | 6/1993 | Siol et al. | |
| 5,270,397 A | 12/1993 | Rhein et al. | |
| 5,280,073 A | 1/1994 | Siol et al. | |
| 5,548,033 A | 8/1996 | Vetter et al. | |
| 5,652,316 A | 7/1997 | May et al. | |
| 5,705,189 A | 1/1998 | Lehmann et al. | |
| 5,880,235 A | 3/1999 | Schwind et al. | |
| 6,040,387 A | 3/2000 | Albrecht et al. | |
| 6,172,135 B1 * | 1/2001 | Fraser et al. | 523/201 |
| 6,287,470 B1 | 9/2001 | Vetter et al. | |
| 6,355,712 B1 | 3/2002 | Schultes et al. | |
| 6,576,255 B1 | 6/2003 | Petereit et al. | |
| 6,613,871 B2 | 9/2003 | Hoess et al. | |
| 6,689,832 B1 * | 2/2004 | Rostami | 524/423 |
| 6,765,046 B1 | 7/2004 | Numrich et al. | |
| 6,803,416 B2 | 10/2004 | Schultes et al. | |
| 6,809,163 B2 | 10/2004 | Schultes et al. | |
| 6,890,993 B2 | 5/2005 | Schultes et al. | |
| 6,998,140 B2 | 2/2006 | Meier et al. | |
| 7,046,952 B2 | 5/2006 | Kurotori et al. | |
| 7,179,852 B2 | 2/2007 | Schultes et al. | |
| 2002/0160042 A1 | 10/2002 | Petereit et al. | |
| 2004/0104501 A1 | 6/2004 | Petereit et al. | |
| 2004/0116567 A1 | 6/2004 | Schmitt et al. | |
| 2004/0191485 A1 | 9/2004 | Groothues et al. | |
| 2004/0213989 A1 | 10/2004 | Hasskerl et al. | |
| 2005/0016213 A1 | 1/2005 | Hasskerl et al. | |
| 2005/0065224 A1 | 3/2005 | Menzler et al. | |
| 2005/0080188 A1 | 4/2005 | Schultes et al. | |
| 2005/0118434 A1 | 6/2005 | Hasskerl et al. | |
| 2006/0052515 A1 | 3/2006 | Schultes et al. | |
| 2006/0121248 A1 | 6/2006 | Lorenz et al. | |
| 2006/0147714 A1 | 7/2006 | Schultes et al. | |
| 2007/0055017 A1 | 3/2007 | Schultes et al. | |
| 2007/0066708 A1 | 3/2007 | Goldacker et al. | |
| 2007/0112135 A1 | 5/2007 | Wicker et al. | |
| 2007/0122624 A1 | 5/2007 | Schultes et al. | |
| 2007/0123610 A1 | 5/2007 | Schultes et al. | |
| 2007/0222117 A1 | 9/2007 | Hoess et al. | |
| 2007/0276093 A1 | 11/2007 | Schultes et al. | |

FOREIGN PATENT DOCUMENTS

| | | |
|---|---|---|
| EP | 0 600 332 | 6/1994 |
| EP | 0 781 808 B1 | 7/1997 |
| EP | 1 006 152 B1 | 6/2000 |
| EP | 1 108 731 A2 | 6/2001 |
| GB | 2 080 199 A | 2/1982 |
| WO | WO0029480 * | 5/2000 |
| WO | WO 00/75227 A1 | 12/2000 |

OTHER PUBLICATIONS

U.S. Appl. No. 10/548,878, filed Sep. 14, 2005, Hasskerl et al.
U.S. Appl. No. 10/523,971, filed Feb. 8, 2005, Theil et al.
U.S. Appl. No. 10/539,057, filed Jun. 15, 2005, Hasskerl et al.
U.S. Appl. No. 10/538,887, filed Jun. 14, 2005, Hasskerl et al.
U.S. Appl. No. 10/539,126, filed Jun. 16, 2005, Hasskerl et al.

* cited by examiner

*Primary Examiner*—Bernard Lipman
(74) *Attorney, Agent, or Firm*—Oblon, Spivak, McClelland, Maier & Neustadt, P.C.

(57) ABSTRACT

The invention relates to a moulding composition and to the mouldings which can be produced therefrom. Due to their good resistance in the hot water cycle test and in the hot-water/isopropanol test, the plastics mouldings have particularly good suitability for the production of sanitary components.

15 Claims, No Drawings

ARTICLES MADE OF PMMA MOLDING COMPOUND

CROSS-REFERENCES TO RELATED APPLICATIONS

This application is a national stage application of International Patent Application No. PCT/EP03/08211, filed on Jul. 25, 2003, and claims priority to German Patent Application No. 102 43 062.4, filed on Sep. 16, 2002, both of which are incorporated herein by refernce in their entireties.

The present invention relates to polymethyl methacrylate moulding compositions, to polymethyl methacrylate sheets which can be produced therefrom for the production of sanitary items, and to the sanitary items.

PRIOR ART

Polymethyl methacrylate (PMMA) sheets are known for the production of sanitary items, such as bathtubs, shower trays and roofs (lamp covers) and bed surfaces for sunbeds. They are produced from cast PMMA for reasons of good mechanical and thermal properties, and also good stress cracking resistance, and the resistance to hot water cycles demanded in the sanitary sector.

One way of producing plastics sheets uses polymerization of suitable monomers, which may be in the form of a prepolymerized syrup, in cells with walls composed of glass sheets, e.g. composed of float glass. The glass sheets usually form the base and the ceiling of the cells, which are sealed at the sides using suitable measures, for example sealing strips or tapes.

DE 19 832 018.3 describes the production of the cast material. The sheets are marketed by Röhm GmbH & Co. KG with the trademark PLEXIGLAS® GS. Its high molecular weight, up to several million, and optional slight crosslinking give cast PMMA good chemical resistance, good stress cracking resistance, and resistance to hot water cycles. Suitability for sanitary sector applications is particularly apparent from performance in the hot water cycle test, in which a test specimen sheet is immersed in water at 100° C. and removed and dried after cooling of the water. The number of cycles withstood in the hot water cycle test can be used to differentiate between suitable and unsuitable materials.

European standard EN 263 describes the required minimum properties of the material for sanitary sector use.

From Figures 11 and 12 on page 12 of the brochure "Verarbeitungsrichtlinien umformen" [Guidelines for forming processes], identification number 3112, April 2001 issue, published by Röhm GmbH & Co. KG in April 2001, it can be seen that the required force per square millimetre for forming cast PLEXIGLAS® is markedly higher than the corresponding force per square millimetre for forming extruded PLEXIGLAS®. This means that the moulding of filigree structures in PLEXIGLAS® GS is less easy than in PLEXIGLAS® XT.

High retention forces arise in the machines, and the temperatures required to form PLEXIGLAS® GS are very high. This leads to expensive machines which are highly mechanically stable, and high energy consumption during heating of the sheets prior to thermoforming. For economic reasons, and to meet processors' requirements, easier thermoforming is therefore desirable.

The production of cast PMMA is complicated and expensive, because each sheet has to be polymerized separately in a mould composed of two glass sheets. Attempts have therefore previously been made to produce sanitary-applications products which are less expensive and easier to thermoform via continuous processes.

Attempts have also been made to produce sanitary materials in the form of extruded panels which are easier to form. For example, coextruded sheets have been produced with a plastics layer composed of a low-cost free-flowing thermoplastic moulding composition, such as ABS, and a thin PMMA outer layer DE 44 36 381.

These products are in principle suitable for sanitary sector use, but they have the disadvantage that the PMMA has been securely bonded to the thermoplastic and can then only be recycled as regrind for low-quality applications.

Object

The numerous attempts to produce sanitary materials confirm the need for a low-cost material which is easy to form, stress-cracking resistant and resistant to the hot water cycle test. The surface quality of the material is to be high. No scratching or scoring is permissible. However, all of the known products have one or more disadvantages, such as high price, poor formability, restricted recyclability, uneven surface or low resistance to the hot water cycle test.

Achievement of object

By extruding a PMMA moulding composition, we have now succeeded in producing a sheet material which is composed of straight PMMA or of impact-modified straight PMMA and is intended for applications in the sanitary sector, and does not have the abovementioned disadvantages. The object has been achieved by providing a moulding composition and processing it via conventional extrusion known per se to give plastics mouldings.

The material passes the hot water cycle test over at least 20 cycles, and at the end of its product service lifetime can easily be completely converted via thermal recycling to monomeric methyl methacrylate and thus made available again for use in high-quality production.

DESCRIPTION OF THE INVENTION

The formulation of the material of the invention is as follows:

from 96 to 99.5% by weight of methyl methacrylate
from 0.5 to 4.0% by weight of an ester of acrylic acid, e.g. methyl acrylate, ethyl acrylate, propyl acrylate, isopropyl acrylate, butyl acrylate or isobutyl acrylate.

Up to 30% by weight of monomers copolymerizable with methyl methacrylate may also optionally be present, and preference is given to up to 10% by weight content. Examples of monomers which may be used and are copolymerizable with methyl methacrylate are styrene and substituted styrene, such as methylstyrene or chlorostyrene.

In principle, higher esters of acrylic acid are also suitable for use, but the resultant materials are then soft.

The average molecular weight of the moulding composition of the invention is from 140 000 to 180 000, preferably from 150 000 to 170 000 and very particularly preferably from 155 000 to 165 000 (determined by SEC).

Polydispersity was calculated by the method of M. D. Lechner, K. Gehrke, E. H. Nordmeier: Makromolekulare Chemie [Macromolecular chemistry], Birkhäuser Verlag, Basle, 1993, 1st edn., p. 7, and is from 0.9 to 1.5.

Via preparation of a plastics moulding composition from straight or impact-modified PMMA, the material of the invention is suitable for the production of semifinished products.

In order obtain the desired properties, the selection of the plastics moulding composition is such that the comonomer content, the molecular weight, the molecular weight distribution, and optionally the impact modifier content are within a certain range. The formulation of the invention and extrusion by the process known to the person skilled in the art has been found to give a semifinished sheet whose thermal, mechanical and surface properties are within the range required for semifinished sanitary products. In particular, the resistance of the sheet material to hot water cycles is at least 20 cycles in the EN 263 hot water cycle test.

The semifinished plastics products of the invention may be produced either in impact-modified form or else in non-impact-modified form. The amount of impact modifier is adjusted so that the heat resistance of the material remains at the required high level adequate for sanitary materials.

Impact modifiers for polymethacrylates are well-known. The preparation and structure of impact-modified polymethacrylate moulding compositions are described by way of example in EP-A 0 113 924, EP-A 0 522 351, EP-A 0 465 049 and EP-A 0 683 028.

Polymethacrylate matrix

The impact-modified moulding composition is composed of from 70 to 99% by weight of a matrix which [lacuna] of from 80 to 100% by weight, preferably from 90 to 98% by weight, and particularly preferably from 96 to 99.5% by weight, of free-radical-polymerized methyl methacrylate units and of from 0.5 to 20% by weight, preferably from 0.5 to 10% by weight, and very particularly preferably from 0.5 to 4% by weight, of other comonomers capable of free-radical polymerization, e.g. $C_1$-$C_4$-alkyl acrylates, in particular methyl acrylate, ethyl acrylate or butyl acrylate. The average molar mass Mw of the matrix is preferably in the range from 90 000 to 200 000 g/mol, in particular from 130 000 to 190 000 g/mol or from 140 000 to 180 000 g/mol.

Impact modifiers

From 1 to 30% by weight, preferably from 2 to 20% by weight, particularly preferably from 3 to 15% by weight, in particular from 5 to 12% by weight, of an impact modifier which is an elastomer phase composed of crosslinked polymer particles is present in the polymethacrylate matrix, the amounts stated being based on the elastomer phase. The impact modifier is obtained in a manner known per se by bead polymerization or by emulsion polymerization.

In the simplest case the material is crosslinked particles obtainable by bead polymerization with an average particle size in the range from 50 to 500 μm, preferably from 80 to 120 μm. These are generally composed of at least 40% by weight, preferably 50 to 70% by weight, of methyl methacrylate, from 20 to 40% by weight, preferably from 25 to 35% by weight, of butyl acrylate, and from 0.1 to 2% by weight, preferably from 0.5 to 1% by weight, of a crosslinking monomer, e.g. a polyfunctional (meth)acrylate, such as allyl methacrylate, and, where appropriate, other monomers, e.g. from 0 to 10% by weight, preferably from 0.5 to 5% by weight, of $C_1$-$C_4$-alkyl methacrylates, such as ethyl acrylate or butyl methacrylate, preferably methyl acrylate, or other vinylically polymerizable monomers, e.g. styrene.

Preferred impact modifiers are polymer particles which have a two-, or particularly preferably a three-layer core-shell structure and can be obtained by emulsion polymerization (see, for example, EP-A 0 113 924, EP-A 0 522 351, EP-A0 465 049 and EP-A 0 683 028).

Typical particle sizes for these emulsion polymers are in the range from 100 to 500 nm, preferably from 200 to 400 nm.

One way of creating a three-layer or three-phase structure with a core and two shells is as follows. An example of the constitution of an innermost (hard) shell substantially involves methyl methacrylate, small proportions of comonomers, e.g. ethyl acrylate, and a proportion of crosslinking agent, e.g. allyl methacrylate. The structure of the middle (soft) shell may be composed of butyl acrylate, for example, and where appropriate, styrene, while the outermost (hard) shell is mostly substantially identical with the matrix polymer, the result being compatibility and good binding to the matrix. The polybutyl acrylate content of the impact modifier is decisive for the impact-modifying action and is preferably in the range from 20 to 40% by weight, particularly preferably in the range from 25 to 35% by weight.

Impact-modified polymethacrylate moulding compositions

The impact modifier and matrix polymer may be mixed in the melt in the extruder to give impact-modified polymethacrylate moulding compositions. The material discharged is generally first chopped to give pellets. These may be further processed by way of extrusion or injection moulding to give mouldings, such as sheets or injection mouldings.

Notched impact strength and flowability in the prior art

ISO 179/1 eA Charpy notched impact strengths NISs of mouldings composed of commercially available impact-modified polymethacrylate moulding compositions are in the range from 3.0 to 5.0 kJ/m$^2$.

MVR (230° C./3.8 kg) flowabilities of commercially available impact-modified polymethacrylate moulding compositions are in the range from 0.4 to 8.1 cm$^3$/10 min to ISO 1133. The flowability of impact-modified polymethacrylate moulding compositions is to be maximized, in particular for processing by injection moulding. Flowability-optimized impact-modified polymethacrylate moulding compositions achieve MVR values (230° C./3.8 kg, ISO 1133) in the range up to about 10.0 cm$^3$/10 min.

The content by weight of impact modifier in the plastics moulding composition of the invention is from 0 to 15% by weight, based on the matrix composed of PMMA and comonomers. Impact-modifier content is measured as rubber-phase content, rubber phase being the phase composed of the impact-modifier particle and having elastic properties and having a structure composed, for example, of butyl acrylate. A polybutadiene rubber may also be used as rubber phase of the impact modifier.

The Vicat temperature (B 50, determined to DIN ISO 306) is >105° C. for the moulding composition of the invention.

The semifinished products of the invention may comprise the usual additives for sanitary applications, such as white pigments, colour pigments, dispersing agents, UV stabilizers, heat stabilizers, plasticizers, release agents, mould-release agents and optionally anti-microbial agents.

A typical mixing specification for an extrudable mixture comprises by way of example:
  0.2% of titanium dioxide white pigment
  0.006% of colour pigment mixture
  0.005% of HALS stabilizer and or UV absorber
  small amounts of lubricant and or release agent remainder to 100% PMMA plastics moulding composition as described above.

HALS is hindered amine light stabilizer.

The mixing specification may optionally also comprise antimicrobial agents, e.g. triclosan, silver-containing preparations on an inorganic support, e.g. silver-doped zirconium phosphate, e.g. Alphasan RC 2000 or Alphasan RC 5000 from Milliken, polymeric antimicrobial agents, such as poly-tert-butylaminoethyl methacrylate, e.g. Amina T 100 from Creavis GmbH or triazine derivatives, e.g. products of Ciba GmbH, marketed with the name Irgaguard. Antibacterial modification can inhibit multiplication of microbes on the surface under unfavourable hygiene conditions.

The examples below are intended to provide further description of the invention.

Panels composed of PMMA moulding compositions were produced with additives usual in sanitary applications, without impact modifier and with varying content of impact modifier up to a maximum of 13%, based on the rubber phase of the impact modifier, and were tested in the hot water cycle test to EN 263.

The tests were carried out using a sheet (dimensions) [sic], produced from a moulding composition composed of 99% of methyl methacrylate and 1% of ethyl acrylate. The average molar mass was 160 000 g/mol, the Vicat temperature for the sheets is 105° C. and the MVR is 0.8 cm³/10 min.

The residual monomer content of the moulding composition of the invention (moulding composition or moulding, e.g. sheet) is below 0.35% by weight, based on methyl methacrylate content. Methyl methacrylate content was determined by headspace gas chromatography.

The residual monomer content of the moulding composition of the invention is preferably below 0.25% by weight.

Results of hot water cycle test to DIN ISO 263:

| Example: | Result: |
| --- | --- |
| Material of the invention | no cracking during more than 20 cycles |
| Material of the invention + 4% of impact modifier, determined as rubber phase | no cracking during more than 20 cycles |
| PLEXIGLAS ® 7H (comparison) | many fine cracks after one cycle |
| PLEXIGLAS ® 7H + 5% of impact modifier calculated as rubber phase (comparison) | 4 cycles (severe cracking) |
| PLEXIGLAS ® 7H + 10% of impact modifier calculated as rubber phase (comparison) | 12 cycles (many fine cracks) |

Hot water/isopropanol test

The test specimens were dried for 16 hours at 70° C. and stored in a desiccator until the test began. Starting at a temperature 55° C., the test specimens were placed for 10 min in a waterbath. The test specimens were removed and dried, and the surface of the test specimens was wetted with 1 ml of isopropanol. The test specimen was then covered with a watch glass. After 5 minutes, cracking was assessed. If no cracking was detectable in the test specimen, the cycle was continued with the water temperature raised by 5° C.

The temperature at which cracks begin to occur is measured.

| Material | Result |
| --- | --- |
| Material of the invention | 75° C. |
| Inventive + 4% of impact modifier, calculated as rubber phase | 75° C. |
| PLEXIGLAS ® 7H (comparison) | 70° C. |

For comparison, a cast PMMA with an average molar mass of 2 million and the following formulation was tested. Resistance to the hot water cycle test is good, but the high molecular weight of the material makes it difficult to form.

Formulation:

| 98.4 | parts by weight of PMMA syrup with 10% polymer content |
| 0.2 | part by weight of titanium dioxide |
| 1.0 | part by weight of colour paste |
| 0.4 | part by weight of dispersing additive |
| 0.05 | part by weight of HALS |
| 0.01 | part by weight of dimethacrylate crosslinking agent |
| 0.0025 | part by weight of mercaptan regulator |

The experiments and comparative experiments show that only the semifinished sanitary products of the invention are resistant to the hot water cycle test, easy to form and heat-resistant.

The invention claimed is:

1. An impact-modified polymethyl methacrylate molding composition resistant to hot water cycles, wherein said impact-modified polymethyl methacrylate molding composition consists essentially of:
   1) from 70 wt. % to 99 wt. % of a polymethyl methacrylate matrix composition having an average molar mass molecular weight of from 130,000 g/mol to 190,000 g/mol, wherein said polymethyl methacrylate matrix composition consists essentially of:
      a) from 80 wt. % to 99.5 wt. % methyl methacrylate; and
      b) from 0.5 wt. % to 20.0 wt. % vinylic comonomer; and
   2) from 1 wt. % to 15 wt. % of an impact-modifier composition in the form of a crosslinked elastomeric particle, wherein said impact-modifier composition consists essentially of:
      a) from 50 wt. % to 70 wt. % methyl methacrylate;
      b) from 20 wt. % to 40 wt. % butyl acrylate, butadiene, or both;
      c) from 0.1 wt. % to 2 wt. % allyl methacrylate; and
      d) from 0.5 wt. % to 5 wt. % vinylic comonomer.

2. The impact-modified polymethyl methacrylate molding composition resistant to hot water cycles according to claim 1, wherein said vinylic comonomer of said polymethyl methacrylate matrix composition and said vinylic comonomer of said impact-modifier composition is one or more vinylic comonomers selected from the group consisting of an alkyl acrylate, an alkyl methacrylate, and styrene.

3. The impact-modified polymethyl methacrylate molding composition resistant to hot water cycles according to claim 2, wherein said one or more vinylic comonomers is an alkyl acrylate selected from one or more $C_1$-$C_4$ alkyl acrylates.

4. The impact-modified polymethyl methacrylate molding composition resistant to hot water cycles according to claim 2, wherein said one or more vinylic comonomers is an alkyl methacrylate selected from one or more $C_1$-$C_4$ alkyl methacrylates.

5. The impact-modified polymethyl methacrylate molding composition resistant to hot water cycles according to claim 2, wherein said one or more vinylic comonomers is styrene.

6. The impact-modified polymethyl methacrylate molding composition resistant to hot water cycles according to claim 1, wherein said crosslinked elastomeric particle of said impact-modifier composition has an average particle size of from 100 nm to 500 µm.

7. The impact-modified polymethyl methacrylate molding composition resistant to hot water cycles according to claim 1, wherein said impact-modified polymethyl methacrylate molding composition exhibits a flowability of about 10.0 cm³/10 minutes.

8. The impact-modified polymethyl methacrylate molding composition resistant to hot water cycles according to claim 1, wherein said impact-modified polymethyl methacrylate molding composition exhibits a Vicat softening temperature of greater than 105° C.

9. An article consisting essentially of said impact-modified polymethyl methacrylate molding composition resistant to hot water cycles according to claim 1.

10. The article according to claim 9, wherein said article is selected from the group consisting of a sheet, a shower tray, a bathtub, and a sunbed roof.

11. A process of producing an article comprising melting said impact-modified polymethyl methacrylate molding composition resistant to hot water cycles according to claim 1 to produce a melted impact-modified polymethyl methacrylate molding composition, and extruding or injection molding said melted impact-modified polymethyl methacrylate molding composition to produce said article.

12. The process of producing an article according to claim 11, wherein said article is selected from the group consisting of a sheet, a shower tray, a bathtub, and a sunbed roof.

13. The impact-modified polymethyl methacrylate molding composition resistant to hot water cycles according to claim 1, wherein the impact-modified polymethyl methacrylate molding composition further consists essentially of:
   3) the balance being additives.

14. The impact-modified polymethyl methacrylate molding composition resistant to hot water cycles according to claim 1, wherein the impact-modified polymethyl methacrylate molding composition further consists essentially of:
   3) the balance being additives in an amount of up to about 1.6 wt. %.

15. The impact-modified polymethyl methacrylate molding composition resistant to hot water cycles according to claim 1, wherein the impact-modified polymethyl methacrylate molding composition further consists essentially of:
   3) the balance being additives in an amount of up to about 0.2 wt. %.

* * * * *